(12) United States Patent
Nakamura

(10) Patent No.: US 11,566,095 B2
(45) Date of Patent: Jan. 31, 2023

(54) GRAFT COPOLYMER AND SOIL RESISTANT COMPOSITION

(71) Applicant: DAIKIN INDUSTRIES, LTD., Osaka (JP)

(72) Inventor: Hisako Nakamura, Osaka (JP)

(73) Assignee: DAIKIN INDUSTRIES. LTD., Osaka (JP)

( * ) Notice: Subject to any disclaimer, the term of this patent is extended or adjusted under 35 U.S.C. 154(b) by 191 days.

(21) Appl. No.: 17/085,544

(22) Filed: Oct. 30, 2020

(65) Prior Publication Data

US 2021/0130522 A1    May 6, 2021

Related U.S. Application Data

(60) Provisional application No. 62/928,492, filed on Oct. 31, 2019.

(51) Int. Cl.
| | | |
|---|---|---|
| *C08F 236/10* | (2006.01) | |
| *C09J 109/08* | (2006.01) | |
| *C08F 263/04* | (2006.01) | |
| *C09D 151/00* | (2006.01) | |

(52) U.S. Cl.
CPC ........ *C08F 263/04* (2013.01); *C09D 151/003* (2013.01)

(58) Field of Classification Search
CPC ................ C09J 109/08; C08F 236/10
USPC ........................................... 524/803
See application file for complete search history.

(56) References Cited

FOREIGN PATENT DOCUMENTS

| | | | | |
|---|---|---|---|---|
| JP | 71020587 B | * | 2/1966 | |
| JP | 54-132694 A | | 10/1979 | |
| WO | 2007/018276 A1 | | 2/2007 | |
| WO | 2011/122699 A1 | | 10/2011 | |
| WO | WO-2015016103 A1 | * | 2/2015 | ............ B01J 20/264 |

* cited by examiner

*Primary Examiner* — Kelechi C Egwim
(74) *Attorney, Agent, or Firm* — Sughrue Mion, PLLC

(57) ABSTRACT

Provided is a graft copolymer and a treatment method which give excellent antifouling property to a substrate, especially a carpet. The graft copolymer has a trunk polymer having a hydroxyl group; and a branch having a $C_{7-40}$ hydrocarbon group bonded to the trunk polymer at a carbon atom substituted with the hydroxyl group, wherein the branch has a repeating unit formed from an acrylic monomer represented by the formula: $CH_2=C(-X)-C(=O)-Y^1-Z(-Y^2-R)_n$. The treatment method include applying the graft copolymer to the substrate.

15 Claims, No Drawings

GRAFT COPOLYMER AND SOIL RESISTANT COMPOSITION

CROSS-REFERENCE TO RELATED APPLICATIONS

This Application claims benefit under 35 U.S.C. § 119(e) of U.S. Provisional Application 62/928,492 filed Oct. 31, 2019, incorporated herein by reference In its entirety.

TECHNICAL FIELD

The present disclosure relates to a graft copolymer, where opposing chemical properties, such as a hydrophilic portion and a hydrophobic portion, are combined into one molecule, and a soil resistant composition (repellent composition) comprising the graft copolymer. The graft copolymer comprises both a trunk portion and extension portions (that is, grafts or branches) bonding to the trunk portion.

BACKGROUND ART

Products containing perfluorocarbon groups have a long history of providing fluid repellency to a variety of substrates, including paper, textile, carpet, and nonwoven applications (e.g., "Technology of Fluoropolymers", J. G. Drobny, CRC Press, 2001, Chapter 6). In particular, fluorochemical-containing treatments have been beneficially used for treating paper substrates for the express purpose of improving the paper's resistance to penetration by grease and oil. This oleophobicity is useful in a variety of paper applications for quick service restaurant food wrap and pet food bags, as well as carbonless fan-apart forms and other specialty applications ("The Sizing of Paper", J. M. Gess & J. M. Rodriquez ed, TAPPI Press, 2005, Chapter 8)

Graft copolymers may comprise numerous types of structures. Typically, graft and block copolymers are both presented as having long sequences of 2 or more types of monomers. A general discussion of graft copolymers appears in the textbook "Principles of Polymerization", G. G. Odian, Wiley Interscience, 1991, 3$^{rd}$ edition, page 715-725. This discussion teaches, among several paths, that the ceric (IV) ion may be used to cause trunk polymers containing secondary alcohols, such as cellulose or polyvinyl alcohol, to undergo redox reactions with the ceric ion. The resulting polymer radicals are capable of initiating polymerization, thus creating homo or copolymer branches off of the main polymer chain. The resulting branched copolymer is one type of graft copolymer. Graft copolymers provide a vehicle for combining attributes of widely varying monomers into a structure where those attributes are retained.

Conventionally, graft copolymer having a fluoroalkyl group has been used to impart water- and oil-repellency and antifouling property.

JP S54-132694 (A) discloses a process for the production of producing a water- and oil-repellent agent by grafting a vinyl monomer containing a polyfluoroalkyl group on a stem polymer having a hydroxyl group to obtain a fluorine-containing graft polymer.

WO 2007/018276 (A1) discloses a fluorine-containing graft copolymer having a hydroxyl water-soluble polymer stem and fluorine-containing branches bonded to carbon atoms substituted by a hydroxyl group.

WO 2011/122699 (A1) discloses a fluorine-containing graft copolymer having fluorine-containing branches and a repellent composition.

A copolymer free from a fluoroalkyl group did not give sufficient water-repellency and antifouling property (soil resistance).

An object of the present disclosure is to provide a copolymer (particularly a fluorine-free copolymer) which does not have a fluoroalkyl group and which gives sufficient water-repellency and antifouling property.

SUMMARY

The present disclosure relates to a graft copolymer having a bulky hydrocarbon group such as a $C_{7-40}$ hydrocarbon group.

The graft copolymer has a trunk polymer (stem polymer) (which is generally water-soluble) having a hydroxyl group, and branches having a $C_{7-40}$ hydrocarbon group bonded to the trunk polymer at a carbon atom substituted with a hydroxyl group of the trunk polymer.

The branch is bonded to a carbon atom substituted with a hydroxyl group of the (water-soluble) trunk polymer.

Preferred embodiments of the present disclosure are as follows.

[1] A graft copolymer comprising:
a trunk polymer having a hydroxyl group; and
a branch having a $C_{7-40}$ hydrocarbon group and bonded to the trunk polymer at a carbon atom substituted with the hydroxyl group,
wherein the branch comprises a repeating unit formed from an acrylic monomer represented by the formula:

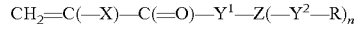

$$CH_2=C(-X)-C(=O)-Y^1-Z(-Y^2-R)_n$$

wherein R each is independently a hydrocarbon group having 7 to 40 carbon atoms,
X is a hydrogen atom, a monovalent organic group or a halogen atom,
$Y^1$ is —O— or —NH—,
$Y^2$ each is independently a direct bond, or a group comprising at least one selected from, —O—, —C(=O)—, —S(=O)$_2$— and —NH—, and
Z is a direct bond, or a divalent or trivalent group having 1 to 5 carbon atoms, and
n is 1 or 2.

[2] The graft copolymer according to [1], wherein the trunk polymer is a water-soluble polymer, and comprises a homopolymer of vinyl alcohol or a copolymer of vinyl alcohol and vinyl acetate.

[3] The graft copolymer according to [1]-[2], wherein the trunk polymer has the number-average molecular weight of 3,000 to 100,000.

[4] The graft copolymer according to [1]-[3], wherein, in the acrylic monomer forming the branch, $Y^2$ is —Y'—, —Y'—Y'—, —Y'—C(=O)—, —C(=O)—Y'—, —Y'—C(=O)—Y'—, —Y'—R'—, —Y'—R'—Y'—, —Y'—R'—Y'—C(=O)—, —Y'—R'—C(=O)—Y'—, —Y'—R'—Y'—C(=O)—Y'— or —Y'—R'—Y'—R'—,
wherein Y' is independently a direct bond, —O— or —NH—,
R' is —(CH$_2$)$_m$— (m is an integer of 1 to 5), a linear hydrocarbon group having an unsaturated bond and 1 to 5 carbon atoms, a hydrocarbon group having a branched structure and having 1 to 5 carbon atoms, or —(CH$_2$)$_l$—C$_6$H$_4$—(CH$_2$)$_l$— (l is an integer from 0 to 5 independently and —C$_6$H$_4$— is a phenylene group).

[5] The graft copolymer according to [1]-[4], wherein the acrylic monomer forming the branch is represented by the formula:

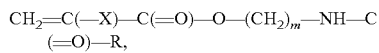

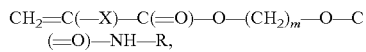

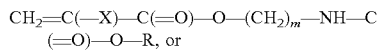

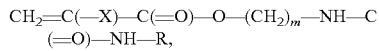

wherein R each is independently a hydrocarbon group having 7 to 40 carbon atoms, X is a hydrogen atom, a monovalent organic group or a halogen atom, m is an integer of 1 to 5.

[6] The graft copolymer according to [1]-[5], wherein, in the acrylic monomer forming the branch, the hydrocarbon group has 18 to 40 carbon atoms.

[7] The graft copolymer according to [1]-[6], wherein the branch further comprises a repeating unit formed from a fluorine-free vinyl monomer.

[8] The graft copolymer according to [7], wherein the fluorine-free vinyl monomer is a monomer wherein a homopolymer of the monomer has a glass transition point or melting point of 80° C. or higher.

[9] The graft copolymer according to [7]-[8], wherein the fluorine-free vinyl monomer is a compound represented by the formula:

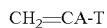

wherein A is a hydrogen atom, a methyl group, a chlorine atom, a bromine atom or an iodine atom, T is a hydrogen atom, a chain or cyclic hydrocarbon group having 1 to 40 carbon atoms, or a chain or cyclic organic group having 1 to 41 carbon atoms and having an ester bond.

[10] The graft copolymer according to [1]-[9], wherein a weight ratio of the trunk polymer to the branch is from 10/90 to 90/10.

[11] The graft copolymer according to [1]-[10], which is a fluorine-free copolymer.

[12] A soil resistant composition, comprising:
an aqueous continuous phase which is water or a mixture of water and an organic solvent; and
the graft copolymer according to [1], dispersed in the aqueous continuous phase.

[13] A method of treating a substrate, comprising applying the soil resistant composition according to [12] to the substrate, and drying the substrate to impart soil resistance to the substrate.

[14] A treated substrate which comprises the graft copolymer according to [1]-[11] adhered to the substrate.

[15] The treated substrate according to [14], wherein the substrate is a carpet.

DETAILED DESCRIPTION

According to the present disclosure, the graft copolymer can give excellent water-repellency and excellent antifouling property (excellent soil resistance) to a substrate.

The soil resistant composition of the present disclosure comprises:
(1) the graft copolymer, and
(2) an aqueous medium which is water or a mixture of water and an organic solvent (aqueous continuous phase).

According to the present disclosure, the polymerization is conducted by radical or ionic initiation in a continuous phase so that the polymerization of extension portion from the trunk portion, the compositions of the trunk and graft and the number and length of the graft are fully controlled it order to give desirable specified structure for final use performances of the graft copolymer.

According to the present disclosure, the final use properties such as antifouling property and/or water repellency in some preferred embodiments can be improved by the application of the soil resistant composition. Thus treated substrate can maintain preferable properties of the untreated substrate such as porosity and surface feeling.

In a preferred embodiment, the soil resistant composition contains an emulsifier (or a surfactant) in an amount of at most 10% by weight, based on the soil resistant composition. In another preferred embodiment, the soil resistant composition contains a solvent in an amount of at most 50% by weight, based on the soil resistant composition.

The present disclosure provides a method of preparing a graft copolymer, which comprises: chain polymerizing a monomer capable of chain polymerizing with said trunk polymer to form a graft copolymer constituting branch(es) from the trunk polymer derived from said monomers, wherein said chain polymerization is conducted in continuous phase, in the presence of a polymerization initiator under neutral to acidic pH conditions, and substantially in the absence of an emulsifying agent or in the presence of an emulsifying agent.

In a preferred embodiment, the polymerization initiator comprises a redox system including an oxidizing agent and a reducing agent where the trunk polymer is the reducing agent and the oxidizing agent comprises a multivalent metal ion.

In yet another preferred embodiment, the multivalent metal ion serving as an oxidizing agent comprises $Ce^{4+}$.

In still yet another preferred embodiment, the trunk polymer is water-soluble or water-dispersible.

In still yet another preferred embodiment, the continuous phase is an aqueous continuous phase.

In still yet another preferred embodiment, the monomers comprise a hydrocarbon-containing monomer (or a hydrocarbon-containing acrylic monomer).

In still yet another preferred embodiment, the continuous phase is an aqueous continuous phase and the hydrocarbon-containing monomer is soluble or dispersible in the continuous phase in the presence of the trunk polymer.

In still yet another preferred embodiment, the hydrocarbon-containing monomer is not soluble or dispersible in the continuous phase in the absence of the trunk polymer.

The present disclosure provides a substrate treated with the soil resistant composition.

In a preferred embodiment, the substrate is a fibrous substrate selected from the group consisting of paper, textiles, carpet and nonwoven materials.

In yet another preferred embodiment, the substrate is nonfibrous selected from the group consisting of metals, plastics, leathers, composites, and glasses, both treated and untreated, porous and non porous.

In yet another preferred embodiment, the treated substrate is prepared by applying the soil resistant composition, optionally in combination with other compounds, via any of spraying, dipping and padding.

In still yet another preferred embodiment, the treated substrate is prepared by incorporating the soil resistant composition while forming said substrate or by incorporating the soil resistant composition into components constituting said substrate.

In still yet another preferred embodiment, the soil resistant composition further comprises a salt of a type and in an amount sufficient to enhance exhaustion of the graft copolymer onto a treated fibrous substrate prepared by immersing the substrate in the soil resistant composition, wherein the substrate is heated either before or after or both before and after immersing in the soil resistant composition to remove excess water.

In still yet another preferred embodiment, the present disclosure provides a substrate treated with the soil resistant composition.

In still yet another preferred embodiment, the treated substrate is further subjected to one or both of washing and drying after treatment with the graft copolymer.

The graft copolymer of the present disclosure may contain both hydrophilic and hydrophobic and/or lipophobic portions. The graft copolymers of the present disclosure contain a trunk polymer. An embodiment of this trunk polymer is hydrophilic and water-soluble or dispersible in its unmodified state. A preferred embodiment of the trunk polymer contains hydroxyl groups. In a further preferred embodiment, the trunk polymer contains secondary hydroxyl groups substituted on the carbons of the hydrocarbon trunk polymer chain. Examples of these types of trunk polymers may be natural and modified starches, celluloses, hemicelluloses, synthetic polyvinyl alcohols, and polyvinyl alcohols/vinyl acetates (that is, a homopolymer of vinyl alcohol or a copolymer of vinyl alcohol and vinyl acetate). The trunk polymer may also be protein-based.

Preferably, the trunk polymer comprises polyvinyl alcohol/vinyl acetate and more preferably contains a predominant fraction of units derived from polyvinyl alcohol. The use of said trunk polymer gives higher water repellency and higher antifouling property.

Vinyl alcohol monomer is not commercially available, so in one possible industrial route, vinyl acetate is polymerized via chain polymerization to a desired molecular weight. The resulting polyvinyl acetate (PVAc) can then be subjected to alcoholysis with methanol via a base-catalyzed reaction. The degree of alcoholysis is controlled to give a desired polyvinyl alcohol concentration. Polyvinyl alcohol/vinyl acetate is commercially available in a wide variety of degrees of alcoholysis and molecular weight, under such trade names as CELVOL.

In the polyvinyl alcohol/vinyl acetate, the molar ratio of polyvinyl alcohol to vinyl acetate may be 100/0 to 10/90, for example 99/1 to 50/50, especially 90/10 to 40/60.

The number-average molecular weight of the trunk may be 500 to 500,000 or 3,000 to 100,000, preferably 500 to 50,000 or 500 to 10,000, particularly 500 to 5,000. Such molecular weight, increases water-repellency and antifouling property. The molecular weight used herein is measured by Gel Permeation Chromatography (GPC).

The hydroxyl group content of the polymer trunk is such that the trunk polymer is water-soluble or dispersible in its unmodified state. Generally, the polymer trunk may have 1 to 100 percent hydroxyl substitution, particularly, 50 to 100 percent hydroxyl group substitution of a polyvinyl acetate trunk polymer prepared from 100% polyvinyl acetate. Particularly preferable trunk polymer is polyvinyl alcohol and polyvinyl alcohol/vinyl acetate.

In other variations on the trunk polymer chain, the hydroxyl concentration may vary from its natural state up to 100%, for example from 20% to 80% of the potential hydroxyl sites for that particular trunk polymer chain.

The hydroxyl groups substituted on the carbons of the hydrocarbon trunk polymer chain are preferably secondary hydroxyl groups. This composition may be obtained via the manufacturing process described above.

A description of the branches having hydrocarbon groups bonded to the polymer trunk at a carbon atom substituted with a hydroxyl group is included below with reference to the acrylic monomers having a hydrocarbon group (vinyl monomers) for use in synthesizing the graft copolymer. The number of branches having hydrocarbon groups per molecule of the graft copolymer depends on its intended use and application. Generally, the weight ratio of the polymer trunk to the branch having hydrocarbon groups (derived, e.g., from acrylic monomers having a hydrocarbon group) may be from 1/99 to 99/1, preferably from 5/95 to 80/20 or from 10/90 to 90/10, particularly from 10/90 to 60/40, from 15/85 to 50/50 or 20/80 to 40/60. Other branches free from fluorine (derived, e.g., from fluorine-free vinyl monomers) may also be present in an amount so as to still achieve the objects of the present disclosure, generally in a weight ratio of up to 90% by weight, for example 10% to 60% of the graft copolymer. The fluorine-free vinyl monomers may also be copolymerized with the acrylic monomers having a hydrocarbon group to create a copolymer graft chain. This graft chain may be random or block, linear or branched in character. The graft chain may consist of the acrylic monomers having a hydrocarbon group or may consist of the acrylic monomers having a hydrocarbon group and the fluorine-free vinyl monomer.

The amount of the graft copolymer in the soil resistant composition is generally from about 5 wt % to about 50 wt %, based on the soil resistant composition. When present as a dispersion in the aqueous continuous phase, the graft copolymer particles have an average particle size (equivalent diameter) of from 0.05 µm to 2.0 µm. The graft copolymer preferably has a number-average molecular weight of from about 1,000 to about 1,000,000, more preferably from about 20,000 to about 200,000.

In addition to the graft copolymer, the soil resistant composition may further contain additives intended to improve the stability and/or performance of the graft copolymer, without particular limitation so long as the objects of the present disclosure are attained.

The continuous phase (which is generally 50% to 95% by weight, based on the soil resistant composition) is generally water, but may further include additional co-solvents in an amount of up to 50% by weight, preferably up to 30% by weight, and most preferably up to 10% by weight, based on total product (i.e., the soil resistant composition). In another preferred embodiment, the soil resistant composition contains substantially no co-solvent (for example, the continuous phase consists of water).

The continuous phase is formed by the aqueous medium. The aqueous medium may be water alone or a mixture of water and a (water-miscible) organic solvent (e.g., alcohols, esters and ketones). The amount of the aqueous medium may be 0.2 to 100 parts by weight, for example, 0.5 to 50 parts by weight, particularly 1 to 50 parts by weight or 1 to 20 parts by weight or 2 to 15 parts by weight, based on 1 part by weight of the graft polymer.

As used herein, the language "substantially contains no co-solvent" means that the soil resistant composition contains a solvent other than water in an amount up to 8% by weight, preferably up to 2% by weight, for example, up to 1% by weight, most preferably contains no solvent other than water.

As used herein, the terms "water-soluble" and "water dispersible" relative to the graft copolymer mean that the graft copolymer (for example, 10 g) may either fully dissolve in water (for example, 100 g) or form a stable colloidal dispersion in water.

The soil resistant composition may contain or may not contain emulsifying agents (or surfactants) such as fatty alcohol ethoxylates and other emulsifying agents known in this field of art. The emulsifying agent may be various emulsifying agents such as cationic, anionic and nonionic emulsifying agents. The amount of the emulsifying agent may be 0 to 30 parts by weight, 1 to 20 parts by weight, based on 100 parts by weight of monomers.

In accordance with the method of preparing the graft copolymer of the present disclosure, monomers capable of chain polymerization are utilized to create extensions (grafts) off of the trunk polymer chain. These monomers in general may have significantly different character and/or performance attributes than the trunk polymer. In a preferred embodiment, these monomers have radically polymerizable terminal groups. The graft copolymer of the present disclosure incorporates one or more of these monomers to create the graft copolymer. A further preferred embodiment is the group of monomers of silicoacrylates, aliphatic acrylates, and other functional acrylates, such as those containing amines, amides, and halides useful for end use performance.

The monomer forming the branch may comprise or consist of (a) an acrylic monomer having a hydrocarbon group. The monomer forming the branch may be only the acrylic monomer having a hydrocarbon group (a), but may further contain (b) a fluorine-free vinyl monomer. The fluorine-free vinyl monomer (b) is a monomer other than acrylic monomer having a hydrocarbon group (a).

The term "acrylic monomer" includes a monomer having an acryloyl group and a monomer having a methacryloyl group. The term "(meth)acrylate" as used herein means an acrylate or methacrylate, and the term "(meth)acrylamide" as used herein means an acrylamide or methacrylamide.

(a) Acrylic Monomer Having Hydrocarbon Group

The acrylic monomer having a hydrocarbon group may be a monomer having a fluorine atom, but is preferably a monomer having no fluorine atom.

The acrylic monomer having a hydrocarbon group monomer is an acrylic monomer (such as a (meth) acrylate or a (meth)acrylamide) having a group composed by at least one selected from —O—, —C(=O)—, —S(=O)$_2$— and —NH—.

The acrylic monomer having a hydrocarbon group (a) is preferably a monomer of the formula:

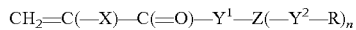

$$CH_2=C(-X)-C(=O)-Y^1-Z(-Y^2-R)_n$$

wherein R each is independently a hydrocarbon group having 7 to 40 carbon atoms, X is a hydrogen atom, a monovalent organic group or a halogen atom preferably excluding a fluorine atom, $Y^1$ is —O— or —NH—, $Y^2$ each is independently a direct bond, or a group comprising or consisting of at least one selected from, —O—, —C(=O)—, —S(=O)$_2$— and —NH—, and Z is a direct bond, or a divalent or trivalent group having 1 to 5 carbon atoms, and n is 1 or 2.

R may be a chain (or non-cyclic) hydrocarbon group or a cyclic hydrocarbon group. R may be a cyclic hydrocarbon group which may have a chain group (e.g., a linear or branched chain hydrocarbon group). The cyclic hydrocarbon group includes a saturated or unsaturated, monocyclic group, polycyclic group, bridged ring group. R is preferably an aliphatic hydrocarbon group, particularly a saturated aliphatic hydrocarbon group, especially an alkyl group. In the R group, the carbon number of the hydrocarbon group is preferably 12 to 30, for example 15 to 26, particularly 17 to 22 or 18 to 24. Specific examples of the R group are a lauryl group, a stearyl group, a behenyl group, a cyclohexyl group, a t-butylcyclohexyl group, an isobornyl group, a dicyclopentanyl group, a dicyclopentenyl group and an adamantyl group.

X may be a hydrogen atom, a methyl group, a halogen atom preferably except for a fluorine atom, a cyano group, a substituted or unsubstituted benzyl group, or a substituted or unsubstituted phenyl group. Examples of X include a hydrogen atom, a methyl group, a chlorine atom, a bromine atom, an iodine atom and a cyano group. X is preferably a hydrogen atom, a methyl group or a chlorine atom, because of higher soil resistance.

$Y^1$ is —O— or —NH—.

$Y^2$ is a divalent or trivalent group. $Y^2$ is preferably a divalent group.

$Y^2$ is preferably a group comprising or consisting of at least one selected from a hydrocarbon group having 1 carbon atom, —C$_6$H$_6$—, —O—, —C(=O)—, —S(=O)$_2$ and —NH— (wherein $Y^1$ is not a hydrocarbon group). Examples of the hydrocarbon group having 1 carbon atom include —CH$_2$—, —CH= and —C≡.

Examples of $Y^2$ include a direct bond, —O—, —NH—, —O—C(=O)—, —C(=O)—O—, —C(=O)—NH—, —NH—C(=O)—, —S(=O)$_2$—NH—, —NH—S(=O)$_2$—, —O—C(=O)—NH—, —NH—C(=O)—O—, —NH—C(=O)—NH—, —O—C$_6$H$_4$—, —NH—C$_6$H$_4$—, —O—(CH$_2$)$_m$—O—, —NH—(CH$_2$)$_m$—NH—, —O—(CH$_2$)$_m$—NH—, —NH—(CH$_2$)$_m$—O—, —O—(CH$_2$)$_m$—O—C(=O)—, —O—(CH$_2$)$_m$—C(=O)—O—, —NH—(CH$_2$)$_m$—O—C(=O)—, —NH—(CH$_2$)$_m$—C(=O)—O—, —O—(CH$_2$)$_m$—O—C(=O)—NH—, —O—(CH$_2$)$_m$—NH—C(=O)—O—, —O—(CH$_2$)$_m$—C(=O)—NH—, —O—(CH$_2$)$_m$—NH—C(=O)—, —O—(CH$_2$)$_m$—NH—C(=O)—NH—, —O—(CH$_2$)$_m$—O—C$_6$H$_4$—, —NH—(CH$_2$)$_m$—O—C(=O)—NH—, —NH—(CH$_2$)$_m$—NH—C(=O)—O—, —NH—(CH$_2$)$_m$—C(=O)—NH—, —NH—(CH$_2$)$_m$—NH—C(=O)—, —NH—(CH$_2$)$_m$—NH—C(=O)—NH—, —NH—(CH$_2$)$_m$—O—C$_6$H$_4$—, —NH—(CH$_2$)$_m$—NH—C$_6$H$_4$— wherein m is an integer of 1 to 5, particularly 2 or 4.

$Y^2$ is preferably —O—, —NH—, —O—C(=O)—, —C(=O)—O—, —C(=O)—NH—, —NH—C(=O)—, —NH—S(=O)$_2$—, —S(=O)$_2$—NH—, —O—C(=O)—NH—, —NH—C(=O)—O—, —NH—C(=O)—NH—, or —O—C$_6$H$_4$—. $Y^2$ is more preferably —NH—C(=O)—, —C(=O)—NH—, —O—C(=O)—NH—, —NH—C(=O)—O— or —NH—C(=O)—NH—.

Z is a direct bond or a divalent or trivalent hydrocarbon group containing 1 to 5 carbon atoms, which may have a linear structure or a branched structure. Preferably, Z has 2 to 4 carbon atoms, particularly 2 carbon atoms. Specific examples of Z include a direct bond, —CH$_2$—, —CH$_2$CH$_2$—, —CH$_2$CH$_2$CH$_2$—, —CH$_2$CH$_2$CH$_2$CH$_2$—, —CH$_2$CH$_2$CH$_2$CH$_2$CH$_2$—, —CH$_2$CH= having a branched structure, —CH$_2$(CH—)CH$_2$— having a branched structure, —CH$_2$CH$_2$CH= having a branched structure,
—CH$_2$CH$_2$CH$_2$CH$_2$CH= having a branched structure,
—CH$_2$CH$_2$(CH—)CH$_2$— having a branched structure, and
—CH$_2$CH$_2$CH$_2$CH= having a branched structure.

Z is preferably not a direct bond, and Y$^2$ and Z are not a direct bond at the same time.

The acrylic monomer (a) is preferably

CH$_2$=C(—X)—C(=O)—O—(CH$_2$)$_m$—NH—C(=O)—R,

CH$_2$=C(—X)—C(=O)—O—(CH$_2$)$_m$—O—C(=O)—NH—R,

CH$_2$=C(—X)—C(=O)—O—(CH$_2$)$_m$—NH—C(=O)—O—R, or

CH$_2$=C(—X)—C(=O)—O—(CH$_2$)$_m$—NH—C(=O)—NH—R, wherein R, X and m are as defined above. The acrylic monomer (a) is particularly preferably CH$_2$=C(—X)—C(=O)—O—(CH$_2$)$_m$—NH—C(=O)—R wherein R, X and m are as defined above. Use of the acrylic monomer (a) can give good water-repellency and antifouling property.

The acrylic monomer (a) can be produced by reacting a hydroxyalkyl (meth)acrylate or a hydroxyalkyl (meth)acrylamide with a bulky alkyl isocyanate. Examples of the bulky alkyl isocyanate include lauryl isocyanate, myristyl isocyanate, cetyl isocyanate, stearyl isocyanate, oleyl isocyanate and behenyl isocyanate.

Alternatively, the acrylic monomer (a) can be produced by reacting a bulky alkylamine or a bulky alkyl alcohol with a (meth)acrylate having an isocyanate group on side chain, for example 2-methacryloyloxyethyl isocyanate. Examples of the bulky alkylamine include laurylamine, myristylamine, cetylamine, stearylamine, oleylamine and behenylamine. Examples of the bulky alkyl alcohol include lauryl alcohol, myristyl alcohol, cetyl alcohol, stearyl alcohol, oleyl alcohol and behenyl alcohol.

Specific examples of the acrylic monomer (a) are as follows.

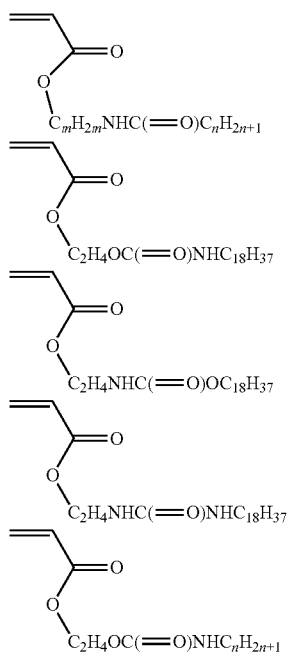

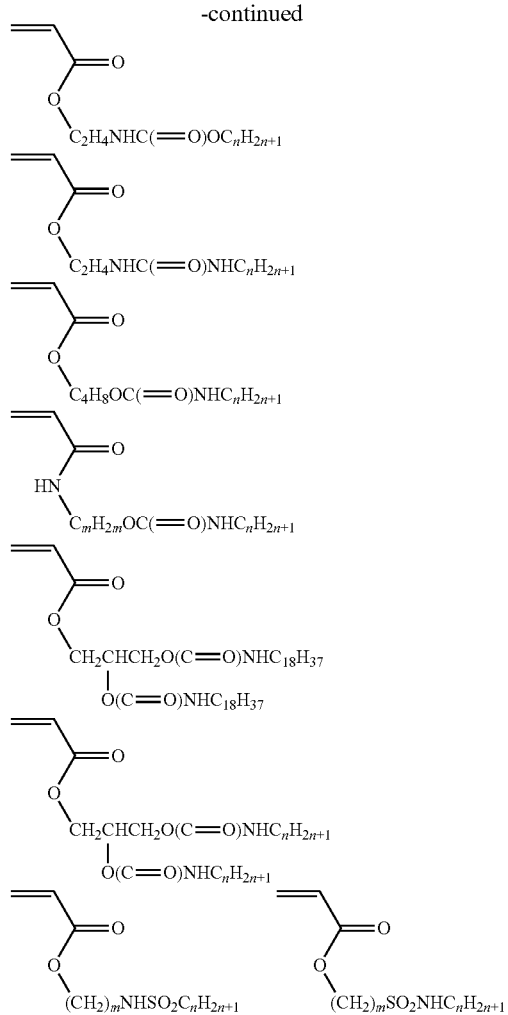

wherein m is an integer of 1 to 5, n is an integer of 7 to 40.

The compounds having the above chemical formulas are an acrylic compound in which the 60-position is a hydrogen atom, and specific examples may be a methacrylic compound in which the α-position is a methyl group and an α-chloroacrylic compound in which the α-position is a chlorine atom.

Typical specific examples of the acrylic monomer (a) include palmitic acid amidoethyl (meth)acrylate, stearic acid amidoethyl (meth)acrylate (i.e., amidoethyl stearate (meth)acrylate), behenic acid amidoethyl (meth)acrylate and myristic acid amidoethyl (meth)acrylate.

The acrylic monomer is preferably an amide group-containing monomer. Examples of the amide group-containing monomer include carboxylic acid amidealkyl (meth)acrylates.

Specific examples of the amide group-containing monomer include palmitic acid amidoethyl (meth)acrylate, stearic acid amidoethyl (meth)acrylate (i.e., amidoethyl stearate (meth)acrylate), behenic acid amidoethyl (meth)acrylate, myristic acid amidoethyl (meth)acrylate, lauric acid amidoethyl (meth)acrylate, isostearic acid ethylamide (meth)acrylate, oleic acid ethylamide (meth)acrylate, tertiary butylcyclohexyl caproic acid amidoethyl (meth)acrylate, adamantanecarboxylic acid ethylamide (meth)acrylate, naphthalenecarboxylic acid amidoethyl (meth)acrylate, anthracenecarboxylic acid amidoethyl (meth)acrylate, palmitic acid amidopropyl (meth)acrylate, stearic acid amidopropyl (meth)acrylate, palmitic acid amidoethyl vinyl ether, stearic acid amidoethyl vinyl ether, palmitic acid amidoethyl allyl ether, stearic acid amidoethyl allyl ether and mixtures thereof.

The amide group-containing monomer is preferably stearic acid amidoethyl (meth)acrylate. The amide group-containing monomer may be a mixture containing stearic acid amidoethyl (meth)acrylate. In the mixture containing stearic acid amidoethyl (meth)acrylate, the amount of the stearic acid amidoethyl (meth)acrylate may be, for example, 55 to 99 wt %, preferably 60 to 85 wt %, more preferably 65 to 80 wt %, based on the weight of all amide group-containing monomers, and the other monomers may be, for example, palmitic acid amidoethyl (meth)acrylate.

The acrylic monomer is preferably an acrylate in which X is a hydrogen atom. The acrylate gives higher water-repellency and antifouling property.

The acrylic monomer may be one alone or a combination of at least two.

(b) Fluorine-Free Vinyl Monomer

The graft copolymer may have a repeating unit derived from the fluorine-free vinyl monomer (b).

The fluorine-free vinyl monomer (b) is a monomer other than the hydrocarbon group-containing acrylic monomer (a). Preferably, the fluorine-free vinyl monomer (b) is a monomer having an acryloyl group or a monomer having a methacryloyl group. Preferably, the fluorine-free vinyl monomer (b) is a monomer wherein a homopolymer of the monomer has a glass transition point or melting point of 80° C. or higher.

A preferred fluorine-free vinyl monomer (b) is represented by the general formula:

$$CH_2=CA-T$$

wherein A is a hydrogen atom, a methyl group, or a halogen atom other than a fluorine atom (for example, a chlorine atom, a bromine atom and an iodine atom), T is a hydrogen atom, a chain or cyclic hydrocarbon group having 1 to 40 carbon atoms, or a chain or cyclic organic group having 1 to 41 (or 2 to 41) carbon atoms and having an ester bond.

Examples of the chain or cyclic hydrocarbon group having 1 to 40 carbon atoms are a linear or branched aliphatic hydrocarbon group having 1 to 40, for example, 1 to 30, carbon atoms, a cycloaliphatic group having 4 to 40, for example, 4 to 30 or 4 to 20, carbon atoms, an aromatic hydrocarbon group having 6 to 40, for example, 6 to 30 or 6 to 20, carbon atoms, and an aromatic aliphatic hydrocarbon group having 7 to 40, for example, 7 to 30 or 7 to 20, carbon atoms. In the formula, T may have one of a bulky hydrocarbon group having 12 to 40 or 16 to 30 carbon atoms and a saturated cyclic hydrocarbon group having 6 to 40 carbon atoms.

Examples of the chain or cyclic organic group having 2 to 41 carbon atoms and having an ester bond are —C(=O)—O-Q and —O—C(=O)-Q wherein Q is a linear or branched aliphatic hydrocarbon group having 1 to 40 carbon atoms, a cycloaliphatic group having 4 to 40 (for example, 6 to 30 or 6 to 20) carbon atoms, an aromatic hydrocarbon group having 6 to 40 (for example, 6 to 30 or 6 to 20) carbon atoms, and an aromatic aliphatic hydrocarbon group having 7 to 40 (for example, 7 to 31 or 7 to 21) carbon atoms.

Examples of the fluorine-free vinyl monomer (b) include a (meth)acrylate ester. The (meth)acrylate ester may be an ester between (meth)acrylic acid and an aliphatic alcohol such as a monohydric alcohol and a polyhydric alcohol (such as a dihydric alcohol).

Examples of the fluorine-free vinyl monomer (b) include: (meth)acrylates such as methyl methacrylate, 2-ethylhexyl (meth)acrylate, cyclohexyl (meth)acrylate, lauryl (meth)acrylate, stearyl (meth)acrylate, hydroxyalkyl (meth)acrylate, tetrahydrofurfuryl (meth)acrylate, polyoxyalkylene (meth)acrylate, 3-chloro-2-hydroxypropyl (meth)acrylate, glycidyl (meth)acrylate, N,N-dimethylaminoethyl (meth)acrylate, N,N-diethylaminoethyl (meth)acrylate, benzyl (meth)acrylate, hydroxypropyl mono(meth)acrylate, 2-hydroxy-3-phenoxypropyl(meth)acrylate, 2-hydroxyethyl (meth)acrylate, glycerol mono(meth)acrylate, β-acryloyloxyethyl hydrogen succinate, β-methacryloyloxyethyl-hydrogen phthalate, 2-acryloyloxyethylhexahydrophthalic acid, 2-acryloyloxyethylphthalic acid, 2-acryloyloxyethyl-2-hydroxyethylphthalic acid, (meth)acrylic acid hydroxypropyltrimethylammonium chloride, dimethylaminoethyl (meth)acrylate, diethylaminoethyl (meth)acrylate, 2-acryloyloxyethyl dihydrogen phosphate, glycosyl ethyl (meth)acrylate, 2-hydroxy-3-acryloyloxypropyl (meth)acrylate, 2-methacryloyloxyethyl acid phosphate, and hydroxypivalic acid neopentyl glycol diacrylate; styrenes such as styrene and p-isopropylstyrene; (meth)acrylamides such as (meth)acrylamide, diacetone(meth)acrylamide, N-methylol(meth)acrylamide, N-butoxymethylacrylamide, and 2-acrylamide-2-methylpropanesulfonic acid; and vinyl ethers such as vinyl alkyl ether.

Other examples thereof further include ethylene, butadiene, vinyl acetate, chloroprene, vinyl halide such as vinyl chloride, vinylidene halide, acrylonitrile, vinyl alkyl ketone, N-vinylcarbazole, vinyl pyrrolidone, 4-vinylpyridine, and (meth)acrylic acid.

The fluorine-free vinyl monomer may be a silicon-containing monomer (for example, (meth)acryloyl group-containing alkylsilane, (meth)acryloyl group-containing alkoxysilane, and (meth)acryloyl group-containing polysiloxane).

Examples of the silicon-containing monomer include: (meth)acryloxytrialkylsilane, (meth)acryloxy-trialkoxysilane, (meth)acryloxypolysiloxane, (meth)acryloxypropyltrialkylsilane, (meth)acryloxypropyl-trialkoxysilane, (meth)acryloxypropylpolysiloxane, allyltrialkylsilane, allyltrialkoxysilane, allylpoly-siloxane, vinyltrialkylsilane, vinyltrialkoxysilane, and vinylpolysiloxane.

The (meth)acryloxypropylpolysiloxane may be:

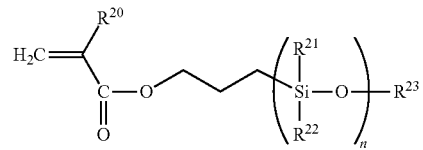

wherein $R^{20}$ is H or $CH_3$, $R^{21}$ is H or $CH_3$, $R^{22}$ is H or $CH_3$, $R^{23}$ is H or $CH_3$, and n is from 1 to 100 (for example, (meth)acryloxypropylpolydimethylsiloxane).

An alkyl (meth)acrylate is preferable as the fluorine-free vinyl monomer. In the alkyl (meth)acrylate, the carbon atom number of the alkyl group is preferably 1 to 40, for example, 1 to 30 or 1 to 20. The alkyl group is linear, branched or cyclic (for example, 4-30 carbon atoms). Examples of the alkyl group include a methyl group, an ethyl group, a n-propyl group, an isopropyl group, a n-butyl, an isobutyl, a t-butyl, a n-pentyl group, a cyclopentyl group, n-hexyl group, a cyclohexyl group, a lauryl group, a stearyl group, a behenyl group, and an isobornyl group.

The fluorine-free vinyl monomer may be one alone or a combination of at least two.

A weight ratio of the hydrocarbon-containing acrylic monomer to the fluorine-free vinyl monomer may be 100/0 to 5/95, usually 95/5 to 5/95, preferably 80/20 to 10/90, more preferably 70/30 to 15/85, for example, 70/30 to 40/60. In this range, the water-repellency, the oil repellency and the soil resistance are high.

Creation of the polymeric grafts from the trunk is performed via initiation of a chain polymerization of the monomer via standard methods (radical or ionic) well known to those skilled in the art. In a preferred embodiment, an initiator that is soluble in the continuous phase is used to initiate chain polymerization starting at the trunk polymer and allowing for the polymerization reaction to proceed. A further preferred embodiment utilizes redox initiators for this purpose. An example is the use of ceric ion or other oxidizing agent, such as a multivalent ion selected from $V^{5+}$, $Cr^{6+}$ and $Mn^{3+}$ to form a free radical along the trunk chain of a polyvinyl alcohol, and the subsequent polymerization proceeding from that free radical.

Further examples of the polymerization initiator include a combination of a peroxide and a reducing agent, a combination of an inorganic reductant and an oxidant or an inorganic-organic redox pair, especially where the trunk polymer or hydrocarbon-containing monomer may act as one component of the redox pair. Other examples are described by Odian, previously referenced. The content of the polymerization initiator depends on the trunk polymer and monomer selection, but is generally from 0.01% to 2.0% by weight of the composition.

A novel and unexpected aspect of the present disclosure is the unique ability of the trunk polymer, by the choice of its structure, to act as an emulsifying agent for the monomer (s) of this polymerization, which are potentially not soluble in the continuous phase. Not being bound to theory, it appears that the trunk polymer takes the place of surface active agents that would typically be required to stabilize monomer in the continuous phase to allow for polymerization. In conventional emulsion and microemulsion polymerizations, these surface active agents are difficult to remove after polymerization is completed, and can act to the detriment of the final polymer's performance and regulatory capacity. Due to the diverse nature of the monomers employed, it may still be necessary to add some emulsifiers and/or co-solvents which enhance the stability of either the polymerization or the resulting graft copolymer, but the amounts and types of these are significantly reduced.

The present disclosure is characterized in that the mild conditions are required to bring about the polymerization. A preferred embodiment of the present disclosure utilizes an aqueous continuous phase for the conduction of the graft polymerization. Depending on the selection of initiators and other components, the graft polymerizations of the present disclosure can take place at room temperature and atmospheric pressure conditions, or at elevated conditions. These polymerizations take place under mild agitation and proceed to a high degree of conversion without excessive effort in a reasonable amount of time. The resulting graft copolymer products are stable dispersions in the continuous phase.

Generally, the reaction conditions suitable for practice of the disclosure are a temperature of from 15° C. to 80° C. at a pressure of 0 psig to 100 psig and a polymerization time of from 5 seconds to 72 hours. It is also preferred that the reaction take place under neutral to acidic pH conditions (for example, pH of 7 to 1).

Of particular interest in these reactions are the ratios (molar ratio) of initiator to monomer, initiator to reactive site on trunk polymer, and monomer to reactive site on trunk polymer. The ratio (molar ratio) of the initiator to the monomer may be 1/99 to 50/50, for example 2/98 to 20/80. The ratio (molar ratio) of the initiator to the reactive site on trunk polymer may be 1/99 to 50/50, for example 2/98 to 20/80. The ratio (molar ratio) of the monomer to the reactive site on trunk polymer may be 1/99 to 95/5, for example 2/98 to 50/50.

Preparation of Soil Resistant Composition:

The graft copolymer, prepared as described above, is dispersed in water or an aqueous phase containing mainly water, in an amount of from 1% to 50% by weight of total using low-shear mechanical mixing. Other agents, such as but not limited to buffers, film forming agents, foaming agents, blocking agents, cross linkers, salts, biological control agents, retaining agents, blooming agents, stabilizers, water-soluble polymers and/or binders may be further added to the soil resistant composition. The soil resistant composition thus prepared is stable and may be stored for use as described in further detail below.

The soil resistant composition may further contain a solvent or organic solvent or water-soluble organic solvent at up to 50 parts of the total soil resistant composition. Specific examples of the water-soluble organic solvent used for this purpose are acetone, ethylene glycol monoethyl ether acetate, ethylene glycol monoethyl ether, ethylene glycol monomethyl ether, ethylene glycol monobutyl ether, propylene glycol monomethyl ether, propylene glycol monomethyl ether acetate, dipropylene glycol monomethyl ether, tripropylene glycol monomethyl ether, propylene glycol butyl ether, propylene glycol dibutyl ether, ethyl-3-ethoxy propionate, 3-methoxy-3-methyl-1-butanol, 2-tert-butoxy ethanol, isopropyl alcohol, n-butyl alcohol, isobutyl alcohol, ethyl alcohol, ethylene glycol, propylene glycol, dipropylene glycol or triproylene glycol. At least two types of the water-soluble organic solvent can be also used in combination.

The soil resistant composition may further contain a surfactant having nonionic, anionic, cationic, and/or amphoteric character in an amount of from 0.1 to 10 wt % of the total composition. The surfactant used for dispersing the polymer may be a cationic emulsifier, an anionic emulsifier, an amphoteric emulsifier or a nonionic emulsifier. General chemical categories of the surfactant used for this purpose include, but are not limited to ethoxylated alcohols, alkyl phenols, ethoxylated fatty acids, ethoxylated fatty alcohols, ethoxylated fatty amines, ethoxylated glycerides, sorbitan esters, ethoxylated sorbitan esters, esters, phosphate esters, glycerin esters, block polymers, propoxylates, alkanol amides, amine oxides, alkyl amine oxides, lanolin derivatives, hydroxysulfobetaines, amine amides, and ethoxylated propoxylated ethers for nonionics, fatty acid salts, sulfates, sulfonates, phosphates, ether carboxylates, naphthalene sulfonates, formaldehyde condensates, and carboxylates for anionics, and alkyl amine salts and quaternary ammonium salts for cationics, and alkyl betaines, alanines, imidazolinium betaines, amide betaines, acetic acid betaines, and amine oxides for amphoterics.

Specific examples of the nonionic emulsifier include a condensation product of ethylene oxide with hexadecanol, n-alkanol, sec-alkanol, t-alkanol, oleic acid, alkane($C_{12}$-$C_{16}$) thiol, sorbitan monofatty acid ($C_7$-$C_{19}$) or alkyl($C_{12}$-$C_{18}$)

amine and the like, and glycol, alkyl glycol ether, diglycol alkyl ether, ketones and esters.

Specific examples of the anionic emulsifier include sodium alkyl($C_{12}$-$C_{18}$) sulfate, alkane($C_{12}$-$C_{18}$) hydroxysulfonic acids and alkene derivative sodium salts, poly (oxy-1,2-ethanediyl), alpha-sulfo-omega-(9-octadecenyloxy)-ammonium salt and the like.

Specific examples of the cationic emulsifier include dodecyl trimethyl ammonium acetate, trimethyl tetradecyl ammonium chloride, hexadecyl trimethyl ammonium bromide, trimethyl octadecyl ammonium chloride, (dodecylmethyl-benzyl) trimethyl ammonium chloride, benzyl dedecyl dimethyl ammonium chloride, dialkyl dimethyl ammonium chloride, methyl dodecyl di(hydropolyoxyethylene) ammonium chloride, benzyl dodecyl di(hydropolyoxyethylene) ammonium chloride, benzyl dodecyl di(hydropolyoxyethylene) ammonium chloride and N-[2-(diethyl-amino)ethyl] oleamide hydrochloride.

Specific examples of the amphoteric emulsifier include lauryl betaine, lauryl dimethylaminoacetic acid betaine, stearyl betaine, and laurylcarboxymethylhydroxy-ethylimidazolinium betaine.

One type of the emulsifiers may be used or at least two types of the emulsifier may be also used in combination.

The soil resistant composition of the present disclosure may also contain stabilizers to maintain the uniformity of the dispersion. These stabilizers may be polymeric, with specific examples including hydroxypropylcellulose, poly(ethylene oxide), sodium styrene sulfonate, or poly (acrylic acid) sodium salt.

The dispersion according to the present disclosure can be applied to the substrate preferably by coating, dipping, spraying, padding, roll coating, or combination of these procedures. For example, a solution having a solids content of 0.1 to 10% by weight of the present disclosure can be used. An example prepared for the treatment of a cellulose (paper) substrate may consist of an aqueous mixture of cooked ethylated corn starch (2% to 20% by weight of solution) combined with the fluorine-free chemical (0.1 to 10% by weight of total solution) of the present disclosure. An example prepared for the treatment of nylon carpet substrate may contain an aqueous mixture of a stain blocking agent (0.1% to 10% by weight of substrate) and/or a foaming agent (0.1% to 10% by weight of total solution) combined with the fluorine-free chemical (0.1% to 10% by weight of total solution) of the present disclosure.

Preparation of Treated Substrates:

The application of these graft copolymers to substrates may proceed along all means familiar to those skilled in the art without particular limitation. The graft copolymers of the present disclosure may be applied to substrates for the purpose of enhancing certain performance characteristics while at the same time not altering other essential characteristics of that substrate via spraying, dipping, padding, or otherwise treating these substrates. After this treatment, these substrates may be further processed via washing, drying and/or subjected to additional finishing treatments. Another novel and unexpected aspect of the present disclosure is the stability of the graft copolymers during these treatment applications. An example is the treatment of paper or textiles, where the graft copolymer of the present disclosure is added to a solution containing multiple other treatments and/or compounds to form a soil resistant composition which is then applied to a paper or textile substrate. The high level of emulsifiers present in existing repellency treatment materials is often detrimental to the chemical and physical stability of this solution. Also, the uniformity of the substrate treatment may be negatively impacted by this solution instability.

Herein, the wordings "treatment of the substrates with the composition" means that the composition is applied to the substrates, and the wordings "treatment of the substrates with the composition" gives the result that the graft copolymer contained in the composition is adhered to the substrates.

The amount of graft copolymer incorporated into the treated substrate depends on the nature of the substrate, the composition of the graft copolymer and intended application. A treatment solution is prepared as previously discussed. This solution can be applied to the substrate preferably by coating, dipping, spraying, padding, roll coating, or a combination of these procedures. As an example of the padding application method, the substrate is padded (dipped) in a bath of the substrate solution, and then excess liquid is usually removed by a squeezing roll to give a dry pickup amount (the weight of dry polymer on the substrate) of from 0.01 to 10% by weight based on the weight of the substrate. Then, the treated substrate is preferably heated at 100-200° C.

U.S. Patent Application Publication No. 2003/0217824 to Bottorff describes various treatment methods and performance evaluation tests for paper as a substrate, and is incorporated herein by reference. U.S. Pat. No. 6,794,010 to Yamaguchi describes various treatment methods and performance evaluation tests for carpet as a substrate, and is incorporated herein by reference. U.S. Pat. No. 5,614,123 to Kubo describes various treatment methods and performance evaluation tests for textile as a substrate, and is incorporated herein by reference. U.S. Pat. No. 5,688,157 to Bradley describes various performance evaluation tests for nonwoven fabrics as a substrate, and is incorporated herein by reference. U.S. Pat. No. 5,688,157 to Bradley discusses internal treatment of nonwoven fabrics with fluorochemicals, while the present disclosure may also be applied topically, as discussed in U.S. Pat. No. 5,834,384 to Cohen, which is incorporated herein by reference. Another novel and unexpected aspect of the present disclosure is that drying of any of the treated substrates may occur at room temperature, with the desired repellency properties being imparted to the substrate.

In another preferred embodiment, the treated substrate is prepared by incorporating the soil resistant composition while forming the substrate or by incorporating the soil resistant composition into components constituting the substrate. For example, during the formation process of paper, the graft copolymer of the present disclosure may be added to an aqueous dilute cellulose fiber solution, along with a polymeric retaining agent, immediately before the formation of the paper. This paper is then further pressed, surface treated or coated, and dried. The drying may occur under either elevated or room temperatures.

In another preferred embodiment, the treated substrate is prepared by exhausting the graft copolymer onto the substrate. U.S. Pat. No. 6,197,378 to Clark describes various treatment methods, formulations, and tests for the exhaust application, and is incorporated herein by reference. The bath prepared for exhaust application typically requires the addition of a metal salt such as but not limited to magnesium sulfate, sodium chloride, potassium chloride, sodium sulfate, calcium chloride barium chloride, zinc sulfate, copper sulfate, aluminum sulfate, and chromium sulfate.

The bath composition pH value can be 0.5 or higher, and the substrate is exposed to steam either before or after or both before and after treatment in the bath. Other components can also be included in the bath, such as stain blockers and acids required to adjust pH of the bath. In another preferred embodiment, the treated substrate is prepared by exhausting the graft copolymer onto the substrate. U.S. Pat. Nos. 5,851,595 and 5,520,962 to Jones describe various treatment methods, formulations, and tests for the exhaust application, and is incorporated herein by reference. The pH of the bath is preferably below 3.5. Excess water from the bath solution is removed by heating the substrate to affect the exhausting of the graft copolymer onto the substrate.

The term "treatment" means that the soil resistant composition is applied to the substrate by, for example, immersion, spray, or coating. The treatment gives the result that the graft copolymer which is an active component of the soil resistant composition is adhered to the substrate, for example, is penetrated into internal parts of the substrate and/or adhered to surfaces of the substrate.

EXAMPLES

The following Examples and Comparative Examples are shown to specifically illustrate the present disclosure. However, the present disclosure is not limited to these Examples.

In the following Examples, parts, % and ratio are parts by weight, % by weight and weight ratio, unless otherwise specified.

The procedures of the tests in the following Examples and Comparative Examples are as follows.

Water-Repellency Test

The water-repellency test was conducted according to AATCC Test Method 193. A treated fabric (carpet) was stored in a thermo-hygrostat having a temperature of 21° C. and a humidity of 65% for at least 4 hours. A test liquid (isopropyl alcohol (IPA), water, and a mixture thereof, as shown in Table 1) which has been also stored at 21° C. was used. The test was conducted in an air-conditioned room having a temperature of 21° C. and a humidity of 65%. Five droplets of the test liquid wherein one droplet has an amount of 50 µL were softly dropped by a micropipette on the fabric. If 4 or 5 droplets remained on the fabric after standing for 30 seconds, the test liquid passed the test. The water-repellency is expressed by a point corresponding to a maximum content of isopropyl alcohol (% by volume) in the test liquid which passes the test. The water-repellency was evaluated as ten levels which are Fail, 0, 1, 2, 3, 4, 5, 6, 7 and 8 in order of a bad level to an excellent level.

TABLE 1

| Water-repellency test liquid | | |
|---|---|---|
| | (% by volume) | |
| Point | Isopropyl alcohol | Water |
| 6 | 60 | 40 |
| 5 | 50 | 50 |
| 4 | 40 | 60 |
| 3 | 30 | 70 |
| 2 | 20 | 80 |
| 1 | 10 | 90 |
| 0 | 0 | 100 |
| Fail | Inferior to isopropyl alcohol 0/water 100 | |

Soil Resistance Test

The soil resistance rest was conducted according to ASTM D6540. The carpet was contaminated with a dry soil having the composition shown in Table 2. In the soil resistance evaluation, ΔE was measured by comparing with the carpet sample before the soil resistance test using a color difference meter. When a value of ΔE is smaller, the soil resistance is better.

TABLE 2

| Ingredients | Wt % |
|---|---|
| Pete Moss | 38 |
| Portland Cement | 17 |
| Kaolin | 17 |
| Silica (200 mesh) | 17 |
| Carbon black | 1.75 |
| Iron oxide (III) | 0.5 |
| Mineral oil | 8.75 |

Preparative Example 1

A graft copolymer was prepared by the following procedure.

8.75 g of 80%-hydrolyzed polyvinyl alcohol (PVA) having an average molecular weight of 10,000 was dissolved in 160 g of water to prepare a PVA solution, to which 26.25 g of amidoethyl stearate acrylate (AmEA) and 3.5 g of stearyl trimethyl ammonium chloride were added. The mixture was heated to 80° C. and emulsified and dispersed by ultrasonic wave. The obtained emulsified dispersion was subjected to nitrogen replacement, and then 1 g of cerium ammonium nitrate (CAN) was added, and the mixture was stirred at 60° C. for 3 hours and reacted to obtain an aqueous dispersion of polymer. This dispersion was further diluted with pure water to prepare an aqueous dispersion having a solid content of 20%.

Preparative Examples 2 to 5

An aqueous dispersion was obtained in the same manner as in Preparative Example 1 by using the Ingredients shown in Examples 2 to 5 of Table 3.

Preparative Example 6

An aqueous dispersion was obtained in the same manner as in Preparative Example 1 except that polyoxyethylene (23) lauryl ether was used instead of stearyl trimethyl ammonium chloride.

Preparative Examples 7 and 8

An aqueous dispersion was obtained in the same manner as in Preparative Example 6 by using the ingredients shown in Table 4.

Comparative Preparative Example 1

A random polymer was prepared by the following procedure.

A mixture liquid was prepared by mixing 28 g of AmEA, 7 g of methyl methacrylate, 3.5 g of stearyl trimethyl ammonium chloride, 10 g of tripropylene glycol, and 160 g of ion-exchanged water. After heating this mixture liquid to 80° C., the mixture liquid was emulsified by a high-pressure homogenizer, and the obtained emulsion was subjected to nitrogen replacement and charged with 0.5 g of 2,2'-azobis (2-amizinopropane) dihydrochloride. Copolymerization reaction was conducted at 60° C. for 3 hours under stirring to obtain a copolymer emulsion. Next, the emulsion was diluted with ion-exchanged water to prepare an aqueous dispersion having a solid content of 20% by weight.

Comparative Preparative Example 2

An aqueous dispersion was obtained in the same manner as in Preparative Example 1 except that stearyl acrylate was used instead of AmEA.

Comparative Preparative Example 3

An aqueous dispersion was obtained in the same manner as in Preparative Example 1 except that methyl methacrylate was used instead of AmEA.

Comparative Preparative Example 4

An aqueous dispersion was obtained in the same manner as in Comparative Preparative Example 1 by using the ingredients shown in Table 4.

Comparative Preparative Examples 5 and 6

An aqueous dispersion was obtained in the same manner as in Preparative Example 6 by using the ingredients shown in Table 4.

Comparative Preparative Example 7

An aqueous dispersion was obtained in the same manner as in Comparative Preparative Example 1 except that stearyl acrylate was used instead of AmEA.

Examples 1 to 5

99.7 g of tap water was added to 0.3 g of the aqueous dispersion prepared in Preparative Examples 1 to 5 to prepare a 0.3% treatment liquid. Then, a 10 wt % aqueous solution of sulfamic acid was added so that the pH was close to 2 to obtain a treatment liquid. A carpet (15 cm×5 cm, PET, cut pile (Density 24 oz/yd$^2$)) washed with tap water and dehydrated to 100% WPU (WPU: wet pick up, WPU is 100% when 100 g of liquid is contained in 100 g of carpet) was immersed in this treatment liquid for 30 seconds so as to have a WPU of 150%. Next, a normal pressure steam treatment (temperature 100 to 107° C.) was conducted for 60 seconds with a pile surface of the carpet facing up, the carpet was lightly rinsed with 2 L of water, and dehydrated to 100% WPU, and a heat treatment was conducted at 120° C. for 10 minutes. Next, a water-repellency test and a soil resistance test were conducted. The results are shown in Table 3.

Comparative Examples 1 to 4

A carpet was treated with the aqueous dispersion prepared in Comparative Preparative Examples 1 to 4 by the same method as in Example 1, and the water-repellency test and the soil resistance test were conducted. The results are shown in Table 3.

Examples 6, 7 and 8

A treatment liquid was prepared by adding 92 g of tap water to 3 g of the aqueous dispersion prepared in Preparative Examples 6, 7 and 8, and 5 g of the stain block agent. A spray application was conducted so that this treatment liquid was added to the carpet (20 cm×20 cm, nylon 6, cut pile (density 32 oz/yd$^2$)) with WPU of 30% (wet pick up, WPU is 30% when 30 g of liquid is contained in 100 g of carpet), and the carpet was heated at a temperature of 110° C. for 5 minutes. Next, a water-repellency test and a soil resistance test were conducted. The results are shown in Table 4.

Comparative Examples 5 and 6

A carpet (15 cm×5 cm, PET, cut pile (density 36 oz/yd2)) was treated with the aqueous dispersion prepared in Comparative Preparative Examples 5 and 6 by the same method as in Example 6, and the water-repellency test and the soil resistance test were conducted. The results are shown in Table 4.

Examples 9 to 11

10 g of 10 wt % magnesium sulfate and 89.7 g of tap water were added to 0.3 g of the aqueous dispersion prepared in Preparative Examples 1 to 3 to prepare a 0.3% treatment liquid, and then 10 wt % sulfamic acid aqueous solution was added so that the pH was close to 4.5, to give a treatment liquid. The carpet was treated in the same manner as in Example 1. A water-repellency and a soil resistance test were conducted. The results are shown in Table 5.

Comparative Examples 7 and 8

A carpet was treated by the same method as in Example 9 except that the aqueous dispersion prepared in Comparative Preparative Examples 2 and 7 was used. A water-repellency test and the soil resistance test were conducted. The results are shown in Table 5.

TABLE 3

| | Ingredients | Weight ratio | Polymer | Water repellency | Soil resistance (ΔE) |
|---|---|---|---|---|---|
| Ex. 1 | PVA/AmEA | 25/75 | Pre. Ex. 1 | 4 | 16 |
| Ex. 2 | PVA/AmEA/MMA | 25/60/15 | Pre. Ex. 2 | 3 | 15 |
| Ex. 3 | PVA/AmEA/MMA/StA | 25/30/15/30 | Pre. Ex. 3 | 3 | 17 |
| Ex. 4 | PVA/AmEA/MMANCM | 25/40/15/20 | Pre. Ex. 4 | 3 | 16 |
| Ex. 5 | PVA/AmEA/MMA/N-MAM | 25/59/14/2 | Pre. Ex. 5 | 3 | 14 |
| Com. Ex. 1 | AmEA/MMA | 80/20 | Com. Pre. Ex. 1 | 2 | 20 |
| Com. Ex. 2 | PVA/StA | 25/75 | Com. Pre. Ex. 2 | 1 | 25 |
| Com. Ex. 3 | PVA/MMA | 25/75 | Com. Pre. Ex. 3 | 0 | 21 |

TABLE 3-continued

| Ingredients | Weight ratio | Polymer | Water repellency | Soil resistance (ΔE) |
|---|---|---|---|---|
| Com. Ex. 4 | MMA | 100 | Com. Pre. Ex. 4 | 0 | 18 |

TABLE 4

| | Ingredients | Weight ratio | Polymer | Water repellency | Soil resistance (ΔE) |
|---|---|---|---|---|---|
| Ex. 6 | PVA/AmEA | 25/75 | Pre. Ex. 6 | 3 | 16 |
| Ex. 7 | PVA/AmEA/MMA | 25/60/15 | Pre. Ex. 7 | 3 | 15 |
| Ex. 8 | PVA/AmEA/MMA/StA | 25/30/15/30 | Pre. Ex. 8 | 3 | 17 |
| Com. Ex. 5 | PVA/StA | 25/75 | Com. Pre. Ex. 5 | 0 | 25 |
| Com. Ex. 6 | PVA/MMA | 25/75 | Com. Pre. Ex. 6 | Fail | 21 |

TABLE 5

| | Ingredients | Weight ratio | Polymer | Water repellency | Soil resistance (ΔE) |
|---|---|---|---|---|---|
| Ex. 9 | PVA/AmEA | 25/75 | Pre. Ex. 1 | 4 | 9 |
| Ex. 10 | PVA/AmEA/MMA | 25/60/15 | Pre. Ex. 2 | 3 | 8 |
| Ex. 11 | PVA/AmEA/MMA/StA | 25/30/15/30 | Pre. Ex. 3 | 4 | 10 |
| Com. Ex. 7 | PVA/StA | 25/75 | Com. Pre. Ex. 2 | 0 | 13 |
| Com. Ex. 8 | StA/MMA | 25/75 | Com. Pre. Ex. 7 | 1 | 15 |

In the Examples including the Tables, the meanings of the abbreviations are as follows:
PVA: Polyvinyl alcohol
AmEA: Amidoethyl stearate (meth)acrylate
MMA: Methyl methacrylate
StA: Stearyl acrylate
VCM: Vinyl chloride
N-MAM: N-methylol acrylamide In the Tables, the water-repellency is better for larger numbers and the antifouling property is better for smaller numbers.

INDUSTRIAL APPLICABILITY

The graft copolymer of the present disclosure can impart excellent water-repellency and antifouling property to various substrates such as paper, textiles (e.g., carpets) and non-woven fabrics.

The invention claimed is:

1. A graft copolymer comprising:
a trunk polymer having a hydroxyl group; and
a branch having a $C_{7-40}$ hydrocarbon group and bonded to the trunk polymer at a carbon atom substituted with the hydroxyl group,
wherein the branch comprises a repeating unit formed from an acrylic monomer represented by the formula:

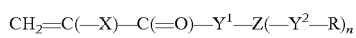

wherein R each is independently a hydrocarbon group having 7 to 40 carbon atoms,
X is a hydrogen atom, a monovalent organic group or a halogen atom,
$Y^1$ is —O— or —NH—,
$Y^2$ each is independently a direct bond, or a group comprising at least one selected from, —O—, —C(=O)—, —S(=O)$_2$— and —NH—, and
Z is a direct bond, or a divalent or trivalent group having 1 to 5 carbon atoms, and
n is 1 or 2.

2. The graft copolymer according to claim 1, wherein the trunk polymer is a water-soluble polymer, and comprises a homopolymer of vinyl alcohol or a copolymer of vinyl alcohol and vinyl acetate.

3. The graft copolymer according to claim 1, wherein the trunk polymer has the number-average molecular weight of 3,000 to 100,000.

4. The graft copolymer according to claim 1, wherein, in the acrylic monomer forming the branch, $Y^2$ is —Y'—, —Y'—Y'—, —Y'—C(=O)—, —C(=O)—Y'—, —Y'—C(=O)—Y'—, —Y'—R'—, —Y'—R'—Y'—, —Y'—R'—Y'—C(=O)—, —Y'—R'—C(=O)—Y'—, —Y'—R'—Y'—C(=O)—Y'— or —Y'—R'—Y'—R'—,
wherein Y' is independently a direct bond, —O— or —NH—,
R' is —(CH$_2$)$_m$— (m is an integer of 1 to 5), a linear hydrocarbon group having an unsaturated bond and 1 to 5 carbon atoms, a hydrocarbon group having a branched structure and having 1 to 5 carbon atoms, or —(CH$_2$)$_l$—C$_6$H$_4$—(CH$_2$)$_l$— (l is an integer from 0 to 5 independently and —C$_6$H$_4$— is a phenylene group).

5. The graft copolymer according to claim 1, wherein the acrylic monomer forming the branch is represented by the formula:

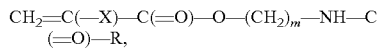

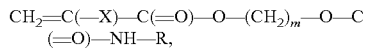

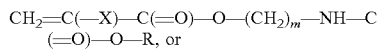

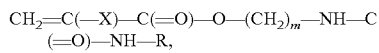

wherein R each is independently a hydrocarbon group having 7 to 40 carbon atoms,
X is a hydrogen atom, a monovalent organic group or a halogen atom,
m is an integer of 1 to 5.

6. The graft copolymer according to claim 1, wherein, in the acrylic monomer forming the branch, the hydrocarbon group has 18 to 40 carbon atoms.

7. The graft copolymer according to claim 1, wherein the branch further comprises a repeating unit formed from a fluorine-free vinyl monomer.

8. The graft copolymer according to claim 7, wherein the fluorine-free vinyl monomer is a monomer wherein a homopolymer of the monomer has a glass transition point or melting point of 80° C. or higher.

9. The graft copolymer according to claim 7, wherein the fluorine-free vinyl monomer is a compound represented by the formula:

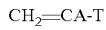

wherein A is a hydrogen atom, a methyl group, a chlorine atom, a bromine atom or an iodine atom,
T is a hydrogen atom, a chain or cyclic hydrocarbon group having 1 to 40 carbon atoms, or a chain or cyclic organic group having 1 to 41 carbon atoms and having an ester bond.

10. The graft copolymer according to claim 1, wherein a weight ratio of the trunk polymer to the branch is from 10/90 to 90/10.

11. The graft copolymer according to claim 1, which is a fluorine-free copolymer.

12. A soil resistant composition, comprising:
an aqueous continuous phase which is water or a mixture of water and an organic solvent; and
the graft copolymer according to claim 1, dispersed in the aqueous continuous phase.

13. A method of treating a substrate, comprising applying the soil resistant composition according to claim 12 to the substrate, and drying the substrate to impart soil resistance to the substrate.

14. A treated substrate which comprises the graft copolymer according to claim 1 adhered to the substrate.

15. The treated substrate according to claim 14, wherein the substrate is a carpet.

\* \* \* \* \*